(12) United States Patent
Gay-Bellile et al.

(10) Patent No.: US 6,862,325 B2
(45) Date of Patent: Mar. 1, 2005

(54) MULTI-STANDARD CHANNEL DECODER

(75) Inventors: Olivier Gay-Bellile, Paris (FR); Xavier Marchal, Courbevoie (FR); Geoffrey Francis Burns, Ridgefield, CT (US); Krishnamurthy Vaidyanathan, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 354 days.

(21) Appl. No.: 09/982,267

(22) Filed: Oct. 17, 2001

(65) Prior Publication Data

US 2002/0070796 A1 Jun. 13, 2002

(30) Foreign Application Priority Data

Oct. 17, 2000 (EP) .............................. 00402871

(51) Int. Cl.[7] .................................. H04N 5/46
(52) U.S. Cl. .................... 375/340; 375/344; 348/607; 348/555; 348/725; 348/554; 712/36; 725/148; 455/247.1
(58) Field of Search ........................... 375/344; 712/36; 348/725; 455/247

(56) References Cited

U.S. PATENT DOCUMENTS

| | | | | |
|---|---|---|---|---|
| 5,453,797 A | * | 9/1995 | Nicolas et al. | 348/607 |
| 5,685,005 A | * | 11/1997 | Garde et al. | 712/36 |
| 5,715,012 A | * | 2/1998 | Patel et al. | 348/555 |
| 5,717,471 A | * | 2/1998 | Stewart | 348/726 |
| 5,950,112 A | * | 9/1999 | Hori et al. | 725/148 |
| 5,995,168 A | * | 11/1999 | Yagi | 348/725 |
| 6,075,935 A | * | 6/2000 | Ussery et al. | 716/17 |
| 6,163,685 A | * | 12/2000 | Dilling et al. | 455/247.1 |
| 6,240,146 B1 | * | 5/2001 | Stott et al. | 375/344 |
| 6,478,222 B1 | * | 11/2002 | Sarfati | 235/380 |
| 6,630,964 B2 | * | 10/2003 | Burns et al. | 348/554 |

FOREIGN PATENT DOCUMENTS

EP 0966157 A1 * 12/1999 ............ H04N/5/46

* cited by examiner

Primary Examiner—Stephen Chin
Assistant Examiner—Sudhanshu C. Pathak
(74) Attorney, Agent, or Firm—Michael E. Belk

(57) ABSTRACT

The invention relates to a multi-standard digital receiver, in a digital video transmission system. It comprises a channel decoder for protecting a transmitted signal against channel transmission errors, the channel decoder comprising:

- a set of co-processors including at least 3 clusters of programmable co-processors for executing the functions of a digital front-end block (DFE), a channel correction block (CHN) and a forward error correction block (FEC), respectively,
- a general purpose processor (DSP) for managing control, synchronization and configuration of the channel decoder, and
- a memory (SM) shared between the clusters and the general purpose processor.

13 Claims, 5 Drawing Sheets

MULTI-STANDARD CHANNEL DECODER

The invention relates to a multi-standard channel decoder for digital systems. It is advantageously applicable to any digital broadcasting standard using any transmission medium.

Many incompatible transmission standards are used in today's digital television broadcasting market. Dedicated implementations using dedicated algorithms are developed in order to meet the high computation power requirements of each channel decoding standard. Having many dedicated solutions increases the development costs and causes each product to be less flexible. On its web site, Oren semiconductor advertises a programmable multi-standard demodulator which is compatible with all major American digital television transmission standards: OR5 1220 DVT US Multi-standard demodulator with FEC, 1998. The device utilizes a mixture of dedicated and programmable functions that are controlled by a special DSP (Digital Signal Processor) core.

It is an object of the invention to provide a multi-standard channel decoder which is compatible with any transmission standard all over the world and thus reduces development and manufacturing costs.

In accordance with the invention, a receiver is proposed in a digital transmission system, comprising a channel decoder for protecting a transmitted signal against channel transmission errors, the channel decoder comprising:
  a set of co-processors including at least 3 clusters of programmable co-processors for executing the functions of a digital front-end block (DFE), a channel correction block (CHN) and a forward error correction block (FEC), respectively,
  a general purpose processor (DSP) for managing control, synchronization and configuration of the channel decoder, and
  a memory (SM) shared between the clusters and the general purpose processor.

The invention also relates to a method of channel decoding in a digital video receiver and to a computer program for carrying out the steps of the method. It also relates to a signal for carrying the computer program.

The invention and additional features, which may be optionally used to implement the invention to advantage, are apparent from and will be elucidated with reference to the drawings described hereinafter.

Figure 1:
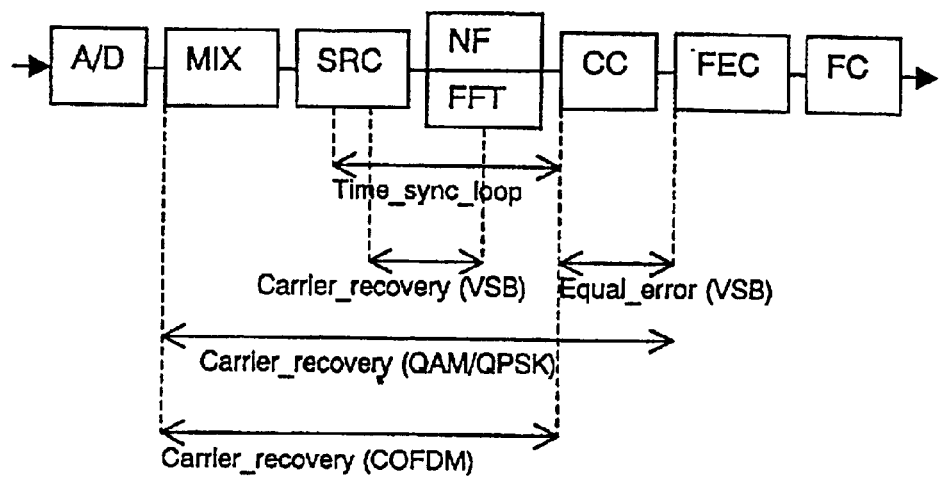
FIG. 1 is a conceptual block diagram illustrating a channel decoder.

There are many different broadcast channel decoding standards used by the different broadcast media, e.g. terrestrial, cable, satellite media, and with different market regions. For example, Europe uses the DVB (Digital Video Broadcasting) standards, North America uses ATSC (Advanced Television Systems Committee) standards and Japan uses the ISDB (Integrated Services Digital Broadcasting) standards. Depending on the medium, several modulations are used, e.g. COFDM (Coded Orthogonal Frequency Division Multiplexing) for terrestrial transmissions, QAM (Quadrature Amplitude Modulation) for cable transmissions and QPSK (Quadrature Phase Shift Keying) for satellite transmissions. A common framework for signal processing and data flow representation in a digital receiver is illustrated in FIG. 1. This already fits all existing broadcast standards. A distinction is made between single carrier modulation formats e.g. 8-VSB (Vestigial Side-Band), QAM, QPSK, and multi-carrier modulation formats e.g. COFDM. The signal processing functions are represented in blocks, including:
  an analog-to-digital converter AID, to receive the analog IF (Intermediate frequency) signal and to output digital IF samples,
  a mixer MIX, to convert the IF samples into digital base-band samples,
  a sample-rate converter SRC, to output time-synchronized samples,
  in the case of single carrier modulation, a Nyquist filter NF of in the case of COFDM modulation, a FFT (Fast Fourier Transform) filter, to generate demodulated symbols,
  a channel correction block CC, to output channel-corrected symbols,
  a forward error correction block FEC, to output error-corrected bits,
  a format converter FC, to output data in the appropriate format, e.g. MPEG (Motion Picture Experts Group) packets.

The signal processing blocks of the demodulator actually perform 3 main functions front-end demodulation, channel correction and forward error correction. The front-end of the demodulator which consists of the A/D, MIX, SRC, Nyquist or FFT filter, is mostly consistent among standards. The ordering of the signal processing and the structure of the time synchronization loop "time_sync_loop" is mostly consistent. The largest point of divergence is the use of the FFT or Nyquist filter, depending on whether the transmission is multi (COFDM) or single carrier-modulated. The interconnections for carrier recovery are implementation-dependent vary in accordance with the standards. Several carrier recovery procedures are thus implemented for each standard, denoted "carrier_recovery (VSB)", "carrier_recovery (QAM/QPSK)" and "carrier_recovery (COFDM)". Key parameter divergences are the overall symbol rate, especially in the case of QPSK.

Channel correction CC is differently implemented, depending on standards. All single carrier systems, except satellite QPSK, use a decision feedback equalizer for channel compensations, denoted "equal_error (VSB)" for the VSB standard. However, depending on the physical medium, the lengths of the adaptive filters vary widely. In a completely different way, the COFDM receiver uses the information in the pilot carriers to interpolate both time and frequency to estimate the channel transfer function. To support implementation changes and to support both single and multi-carrier channel correction, the channel decoder requires software-programmable elements, significant interconnection flexibility and re-assignable computation resources.

Forward error correction FEC, which comprises all signal processing downstream from symbol-bit mapping, is performed differently as far as the convolutional encoding/decoding is concerned. Each standard has particular requirements that may be best achieved with fixed hardware. Examples include the inner bit and symbol interleaving for COFDM, or checksum detection for QAM B (North America cable broadcasting standard). Contiguous parameterized signal processing blocks can play a significant role in a multi-standard forward error correction unit, particularly for error correction, de-scrambling and de-interleaving functions. The bit-true nature of error correction renders it very sensitive to changes in the FEC algorithms. Therefore, FEC should be rendered programmable to support changes in standards, particularly if new error-correcting elements are to be inserted. The interface to the channel equalization and correction portion CC needs to be flexible. A trade-off between feedback latency and error propagation is needed, if partial decoding of convolutional encoded symbols is to be used in error detection for equalization.

A goal of the multi-standard channel decoder according to the invention is also to accommodate the evolution of the channel demodulation market.

Figure 2:
FIG. 2 is a conceptual block diagram illustrating a unified system view of a digital channel decoder according to the invention.

FIG. 2 shows the top level system topology of a unified receiver according to the invention, based on the above considerations. The multi-standard channel decoder consists of a multi-standard digital front-end, a multi-standard channel correction and a multi-standard forward error correction. Therefore, the multi-standard channel decoder comprises 3 main parts:

a digital front-end demodulator DFE whose role is to demodulate the received samples, after analog-to-digital conversion A/D, in order to obtain symbol estimations at the high rate using timing recovery and carrier recovery algorithms to find the optimal sampling time as well as the phase and frequency of the carriers used to modulate the transmitted signal, a channel correction unit CHN to adjust the receiver to the channel impairments and to cope with echoes, a forward error correction unit FEC to correct transmission errors due to the error correction code which has been used to protect the data during transmission.

The 3 blocks are linked together in a direct chain with feedback loops from the channel correction CHN to the demodulator DFE to support carrier recovery and from the forward error correction FEC to channel correction CHN to support equalizer error decisions. The forward error correction unit FEC outputs data packets which may be, for example, MPEG packets.

The multi-standard front-end DFE performs sample-rate conversion, timing recovery, carrier recovery, filtering, demodulation and AGC (Automatic Gain Control) detection. Since carrier recovery is coupled to the mixing (heterodyning/frequency translation) and demodulation functions, it is grouped with the digital demodulation in the digital front-end. Carrier recovery topology is very consistent among the single-carrier standards. However, loop parameter values and the state machine which updates these parameters can vary significantly. In COFDM receiver implementations, a DSP with some hardware support, forms the synchronization loops. Even then the topology is similar, considering that information from the FFT output (demodulator) is used to derive frequency and phase information. This information is processed by the DSP and eventually fed back into the front-end. Such consistent topology suggests that the carrier-recovery section needs only parametric flexibility.

Figure 3:
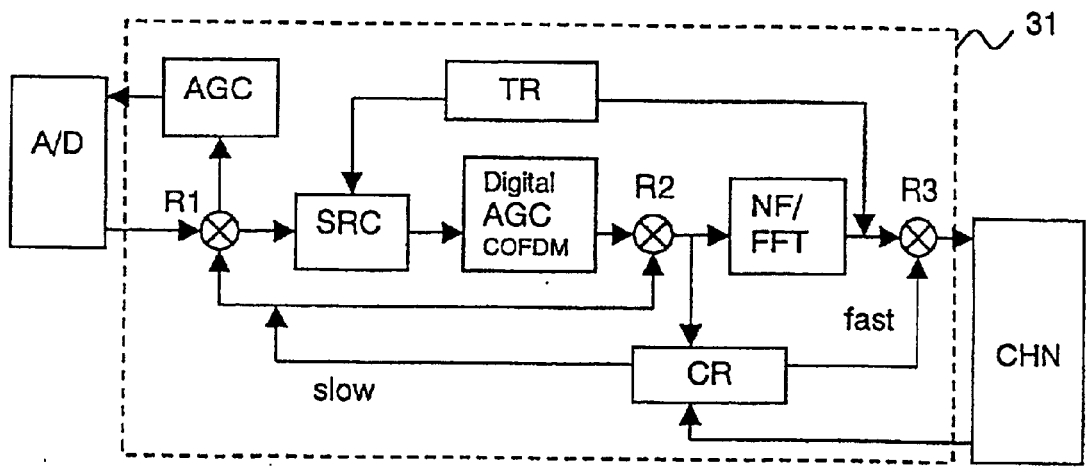
FIGS. 3 to 7 are functional block diagrams illustrating examples of embodiments of a digital channel decoder according to the invention.

The topology shown in FIG. 3 represents an example of topology 31 of the digital front-end DFE of FIG. 2. This topology should fit any front-end demodulator implementation. Three rotators R1, R2 and R3 are present while at most 2 are used, depending on the application considered. The comprises:

an automatic gain control AGC, to match the dynamic range of the incoming analog signal to the one of the A/D converter in order to use the A/D converter at best magnitude, the output of the automatic gain control AGC goes to a variable gain amplifier, not shown, which can be integrated in the A/D converter, a sample-rate converter SRC, to adapt the sample rate of the receiver to the one of the emitter, a digital AGC used only in the case of COFDM, to keep a constant average power signal at the input of the FFT, a Nyquist filter NF or a FFT filter depending on the case, to eliminate the Inter-Symbol Interference (Nyquist) or demodulate the signal (FFT), a time recovery loop TR, to find the adequate phase and frequency of the sampling time, carrier recovery loops CR comprising a slow loop and a fast loop, to find the phase and frequency of the carrier used for the transmission.

From the sample rate converter SRC and upstream, significant parameter flexibility is required to support the variable symbol rates of the different standards, e.g. QAM A (European cable transmission standard) and QPSK. Additional filtering and input formatting, not shown, may be required for a flexible IF interface. This digital demodulator has a consistent topology and even topology changes can be parameterized.

Figure 4:
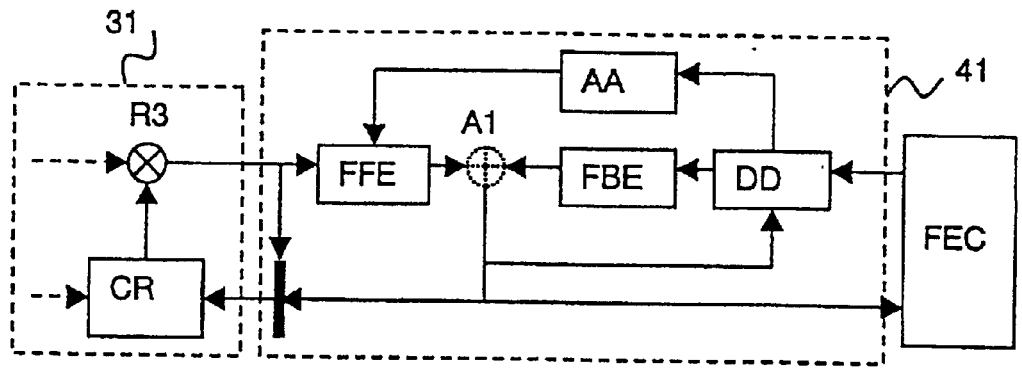
Figure 5:
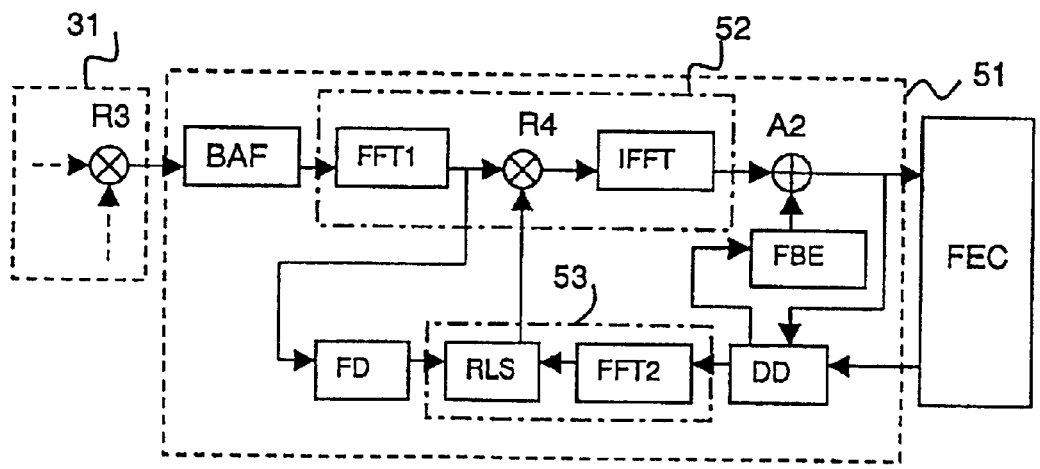
Figure 6:
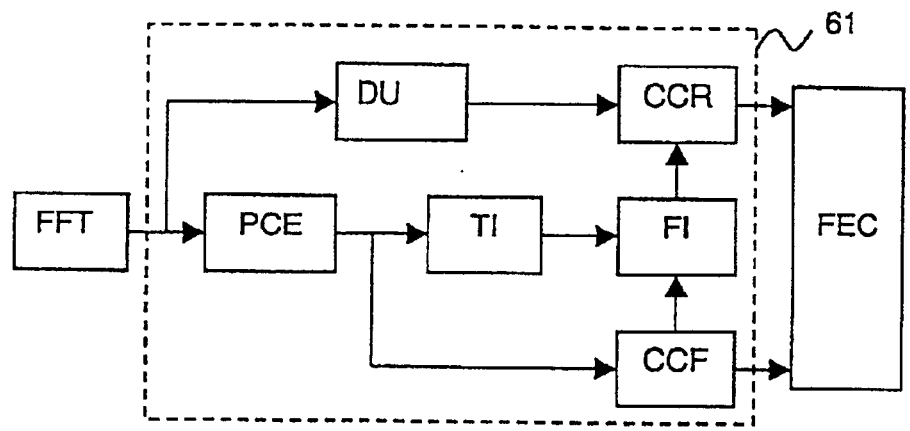

The multi-standard channel correction CHN must at least include 3 different configurations which are illustrated in FIGS. 4 to 6:

a time-domain decision feedback equalizer, a frequency domain channel estimation and correction and hybrid time-domain and frequency domain equalizer.

FIG. 4 shows a general decision feedback equalizer structure 41 for time-domain sample-based equalization, in the channel correction block CHN. Provision has been made for convolutional decoded symbols to play a role in error detection, as well as closing the carrier recovery loop after the equalizer. This solution may typically be used in monocarrier modulations, e.g. QAM, VSB. The channel correction block CHN, represented within the non-continuous block, comprises:

a feed-forward equalizer FFE, which receives the output of the rotator R3 of the Digital Front-end 31 of FIG. 3, to adjust the coefficients of the equalizer to the channel response which is time-variant, a feedback equalizer FBE, to remove the part of the Inter-Symbol Interference from the present estimate caused by previously detected symbols, an adder A1, to add the backward data from the feedback equalizer FBE, and the forward data from the feed-forward equalizer FFE, which will be used for the correction, a decision device DD, to find the emitted symbol that corresponds to the received signal, an adaptation algorithm block AA, to find the correction that has to be realized on the coefficients of the FFE and FBE.

FIG. 5 shows a general topology 51 of a channel correction block CHN, capable of supporting a frequency domain forward equalizer and a time domain decision feedback equalizer for VSB. It comprises:

a bloc accumulation and framing BAF, which receives the output of the rotator R3 to create blocks of data that will be passed through a first FFT unit, a first FFT unit FFT1, to transform the signal from time domain to frequency domain, a frame delay unit FD, to store the data while an equalization is done, a RLS (Recursive Least Squares algorithm) adaptation algorithm, to find the correction that has to be realized on the signal, it calculates the updated coefficients to multiply the frequencies in the FD equalizer, an IFFT unit, to transform back the signal into time domain after the equalization has been done, a multiplier R4, to make a correction on the data coming from the first FFT unit FFT1 thanks to the correction that was recursively estimated by the RLS adaptation algorithm, a decision device DD, to find the emitted symbol that corresponds to the received signal, a feedback equalizer FBE, to remove the part of the Inter-Symbol Interference from the present estimate caused by previously detected symbols, an adder A2, to add the outputs of the feedback equalizer FBE and the feed-forward equalizer 52, a second FFT unit FFT2, to transform the error signal from time domain to frequency domain.

In FIG. 5, the first FFT block FFT1, the multiplier and the IFFT block, shown in a mixed dashed parallelogram 52, replace the Feed Forward Equalizer FFE of FIG. 4 and the second FFT block FFT2 with the RLS algorithm, shown in a mixed dashed parallelogram 53, replace the adaptation algorithm AA block of FIG. 4.

FIG. 6 illustrates a simplified COFDM channel equalizer 61 in the channel correction block CHN which relies on block processing. It estimates the channel owing to the pilots and interpolates these results to correct the complete channel. The channel equalizer comprises:

a partial channel estimator PCE that uses the scattered pilots (distributed among the symbol) to estimate the channel, a time interpolator TI, to interpolate the result of the PCE from one symbol to the other one, a frequency interpolator FI, to interpolate the result of TI inside one symbol so that an estimation of the channel response is present for every carrier in one symbol, a channel confidence unit CCF, to give some information on the reliability of the output carriers, a channel correction unit CCR, to correct the carriers according to the estimation of the channel response, and a delay unit DU, to store the carriers while the channel estimation is done.

Figure 7:
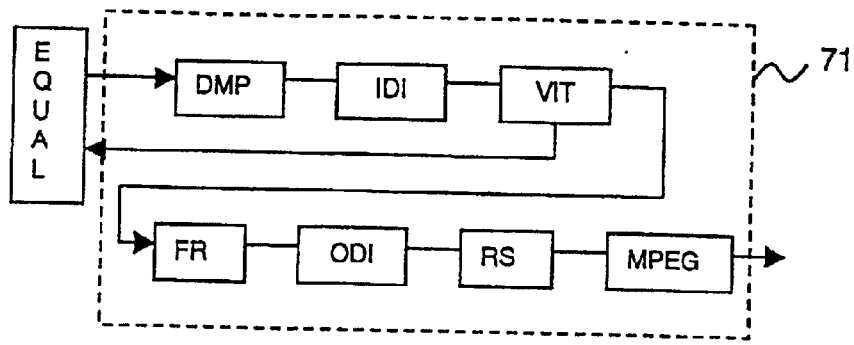

FIG. 7 illustrates an example of a topology 71 for a unified FEC. It comprises:

a de-mapper, DMP which receives the symbols and confidence estimate stream from the equalizer EQUAL which is embedded in the channel corrector CHN, an inner de-interleaver IDI used for COFDM only, to allow the correction of burst error, a trellis/Viterbi decoder VIT, to decode the convolutional code used in the emitter, a framer FR, to create the blocks of data that will be used by the Reed-Solomon decoder, an outer de-interleaver ODI, to allow the correction of burst error, a Reed-Solomon decoder RS, to decode the Reed-Solomon code used in the emitter, an MPEG formatter MPEG which outputs MPEG packets.

Figure 8:
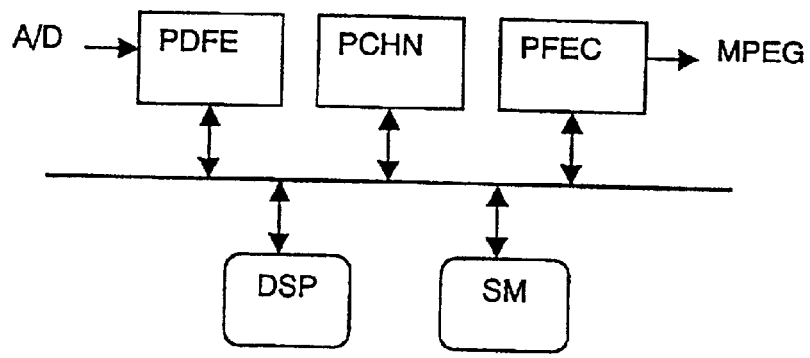
FIG. 8 is a block diagram of an architecture of a programmable digital receiver according to the invention.

FIG. 8 illustrates an example of an architecture for implementing a multi-standard channel decoder according to the invention. The proposed architecture is a heterogeneous architecture comprising a processor, e.g. a DSP, and its memory, empowered by specific, powerful, adequately programmable co-processors. Together with the DSP, each co-processor performs a well-defined system function. The architecture comprises 3 clusters of co-processors corresponding to the 3 main parts of the channel decoder as described in FIG. 2: a programmable digital front-end cluster of co-processors PDFE, a programmable channel correction cluster of co-processors PCHN and a programmable forward error correction cluster of co-processors PFEC, a general purpose processor DSP, for example the REAL DSP from PHILIPS, and a shared memory SM. The programmable front-end cluster PDFE is designed to perform front-end functions as described in FIG. 3, i.e. acquisition of the signal by performing timing and carrier recovery and demodulation to obtain a base-band signal. This cluster has a large degree of programmability characterized by a finite set of parameters. These parameters should include the Nyquist roll-off factor, the size of the FFT, the Carrier recovery algorithm used, the Timing recovery algorithm used, the rotator used for the corrections. In addition, limited topological flexibility is required to re-arrange internal data flow. The topological flexibility refers to the need to support multiple system configurations, either for supporting different standards or for supporting different receiver algorithms. An example is the need to close the carrier recovery loops from several locations in the signal flow block diagram. The channel correction cluster PCHN is designed to perform channel correction and equalization which allow compensation compensate for channel distortion and attenuation. It requires a high level of topological flexibility in order to implement various algorithms as mentioned above with reference to FIGS. 4 to 6. The forward error correction cluster PFEC is designed to implement the functions described with reference to FIG. 7, i.e. the inverse of the scrambling, convolutional encoding and Reed-Solomon encoding which are performed during transmission in the encoder. It requires moderate topological and parameter flexibility. Parameter flexibility refers to the need to parameterize the design of the blocks and the need for the hardware to support reconfiguration with parameter downloads. An example is a programmable Nyquist filter where the filter length and the filter coefficients are parameters.

Each cluster, combined with the general purpose processor DSP and its shared memory SM is able to deal with the requirements of the corresponding parts of the system described in FIG. 2. The co-processors execute high rate operations while the general purpose processor DSP deals with control, synchronization, the system configuration and some low rate algorithms. Software programmability is thus achieved by using the general purpose processor DSP as a primary processing element and by offloading consistent and recurring operations to the co-processors which are used as accelerators. The second cluster of co-processors PCHN may, for example, comprise an adaptive filter array co-processor and a FFT (Fast Fourier Transform) co-processor. The third cluster of co-processors PFEC may contain a Viterbi decoder co-processor, a Reed-Solomon decoder co-processor and a De-interleaver co-processor. The choice of the co-processors is based on computational locality and processing power. It is necessary to promote computational locality to minimize data communications between processing elements, and to be aware of the processing bandwidth to ensure that an optimal hardware/software partition is achieved.

Figure 9:
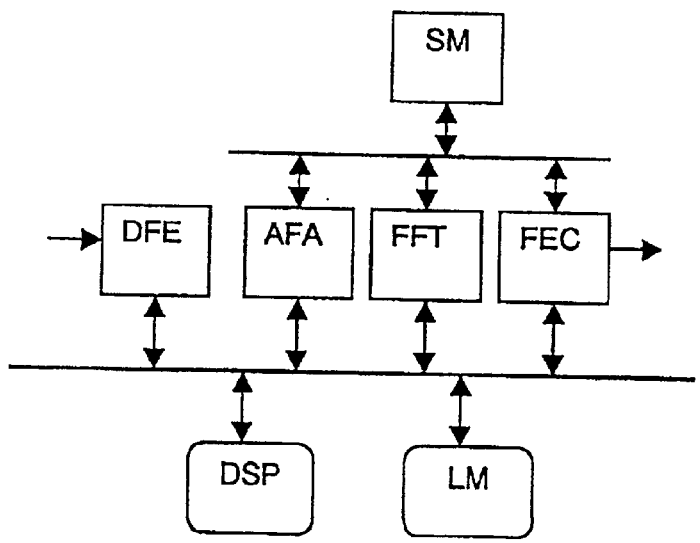
FIGS. 9 to 11 are functional block diagrams illustrating examples of embodiments of an architecture of a receiver according to the invention.

Based on the topologies defined and described with reference to FIGS. 3 to 7, four specific co-processors can be used. A preferred embodiment of the decoder according to the invention is illustrated in FIG. 9. The four co-processors include:

a digital front-end processor DFE for computing the base-band demodulator, the programmable Nyquist filter and for controlling the AGC gain and the synchronization loop, a FFT processor, for performing either the demodulation in multi-carrier systems, or the frequency domain equalization in mono-carrier systems; this processor is separated from the digital front-end DFE because of its potential role in frequency domain equalization, as well as its potential to be imported from existing designs as reusable core, an adaptive filter array processor AFA, for time domain equalization, interference rejection and COFDM frequency interpolation, a forward error correction processor FEC, to decode the Reed-Solomon and convolutional codes and to handle any complex symbol-to-bit mapping and further bit-true decoding operations.

Besides control and configuration, the general purpose processor DSP is used for performing functions that are not computed in the co-processors. The choice of the DSP and its local memory LM bus-system architecture influences the interface definition between the DSP and the co-processors. The memory is called a local memory LM, which means that some co-processors, e.g. the FFT co-processor, can have a local memory which is not shared with the DSP or other components. The choice of the DSP also determines the interface to the co-processors and the hardware/software partition. The DSP should have an appropriate set of tools for software development, appropriate models for hardware/software co-simulation and adequate computational power. Computational power depends on the maximum clock speed and on the internal architecture of the DSP.

The programmable digital front-end processor DFE has limited topological flexibility and significant parameter flexibility. According to FIG. 3, it has to compute:

low-pass filters (anti-aliasing filters for the sample rate converter and Nyquist filters), complex multiplication (rotators for spectrum translation and other correction from synchronization loops), high-speed synchronization loops for mono-carrier modulations (specific detectors, loop filters and numerically controlled oscillators).

Figure 10:
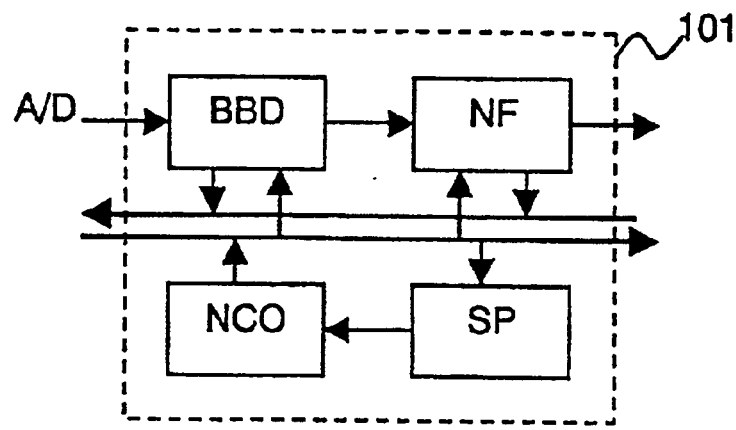

FIG. 10 shows a possible architecture 101 for this front-end processor DFE allowing to perform the functions cited above and illustrated in FIG. 3. The architecture comprises a programmable base-band demodulator BBD, a programmable Nyquist filter NF, a numerically controlled oscillator NCO, and a synchronization processor SP to achieve carrier and time synchronization. The programmable base-band demodulator BBD and the programmable Nyquist filter NF execute mostly filtering and multiplications. They are potential shared hardware.

The base-band demodulator BBD consists of anti-aliasing filters and necessary circuits to perform sample rate conversion (SRC) under the control of the timing recovery loop (TR). All multipliers required to perform the rotation and de-rotation for spectrum translation and carrier recovery (CR) are assumed to be inside the blocks and are not shown separately. The carrier recovery loop (CR) can be closed from several places and these interconnections are provided for. The rotators R1, R2 and R3 can be positioned either at the input or at the output of the block, thereby positioning the loop at the suitable place. Internally, the synchronization processor SP contains the necessary PLLs, and any synchronization support hardware required for the COFDM case. The DSP performs synchronization functions only in the COFDM mode. The base-band demodulator BBD and the Nyquist filter NF blocks are especially composed by low-pass filters and rotators. Thus, it may be possible to move filtering resources like multipliers from one block to one another while reconfiguring the system. This portion is typically area-optimized though the use of multiplier-less filters.

The FFT co-processor of FIG. 9 should accommodate varying FFT/IFFT sizes, e.g. 1K–8K, and up to 3 simultaneous FFT/IFFT operations. In the latter case, the co-processor should optimize the resulting high-bandwidth memory transactions. Ideally, the final design can be derived from one of several FFT processors already available in the market, e.g. within Philips components.

The adaptive filter array processor AFA of FIG. 9 will need to compute one or more adaptive FIR (Finite Impulse response) transversal filters for the purpose of:

time domain equalization using different types of adaptation algorithms, polyphase filters for frequency domain interpolation in COFDM case, interference rejection e.g. NTSC co-channel filter.

In order to realize channel equalization, this co-processor will be closely coordinated by the DSP, which would perform the coefficient update computations. Together with the DSP, this portion has to be highly programmable to account for the various channels (media) which need to be equalized, as well as the diverse equalizer system topologies. According to the computation requirements for the time domain equalizer in the case of the VSB standard, this component can be an array of identical processing elements, each of which is able to compute part of an adaptive filter.

The forward error correction processor FEC of FIG. 9 performs convolutional decoding, all block decoding, de-scrambling, de-interleaving and output formatting functions. Programmable code rate detection, forward error correction, synchronization and framing is supported. Flexibility is required in decoder blocks with the largest anticipated volatility, such as the convolutional decoder. In addition, highly flexible logic entities should be available for future changes in bit-true functions where the consequences of changes in the standards may be serious. In the latter case, the DSP may need to play a role in bit-true error correction functions. Otherwise, fully re-configurable logic may be required.

Figure 11:
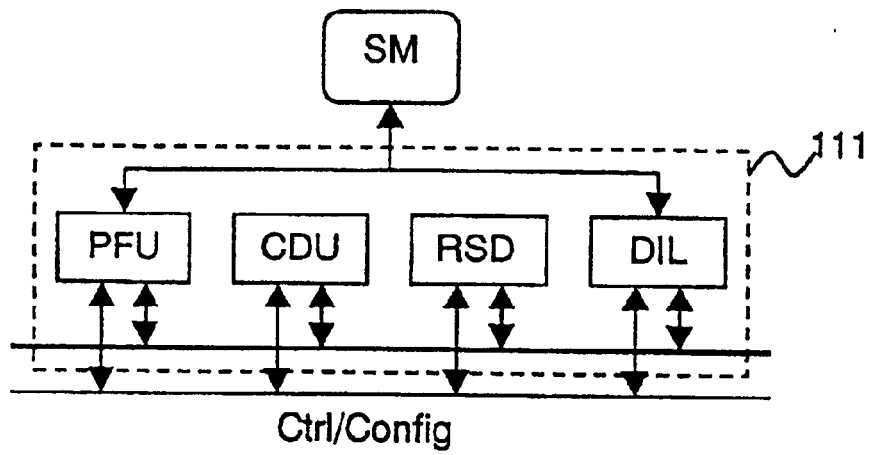

An example of a sub-architecture 111 of the FEC processor is illustrated in FIG. 11. It comprises a programmable function unit PFU, a convolutional decoding unit CDU, a Reed-Solomon decoder RSD and a de-interleaver DIL. More programmability, or separate sub-processors may be required for emerging codes such as turbo codes in satellite transmissions. The possibility of using decoded symbols in equalization may cause the need for truncated trace-back symbols to be generated for feeding back the equalizer. The Reed-Solomon decoder RSD is a variable symbol length decoder. De-scrambling and MPEG formatting functions may be performed with simple parameter programmability. A programmable Forney de-interleaver may be realized with an address generator, supported by access to the shared memory system. Additional blocks, such as inner symbol and bit de-interleaver for OFDM may require additional fixed blocks.

Figure 12:
FIG. 12 is a block diagram showing an example of a digital television receiver according to the invention.

The main functional blocks of an example of a digital television receiver are shown in FIG. 12. This receiver is designed to receive video programs from a digital broadcasting television system compatible with the MPEG standard. The receiver comprises:

a tuner TUN to receive an analog input signal and to convert it into a lower intermediate frequency signal, a channel decoder CHD according to the invention to perform channel decoding of the received signal as described above in relation to FIGS. 2 to 11, comprising demodulation to convert the analog signal into a digital signal and to demodulate this signal in order to achieve synchronization of the received data, and error correction to correct transmission errors, a source decoder SD to decode the received message representing video images, for example an MPEG decoder, a display device DIS for displaying the decoded video images comprising a television cathodic tube.

A flexible multi-standard digital receiver has been described which allows to match silicon area and power constraints. Its main advantages are the following:

ability to efficiently receive broadcasts from any existing format, over cable, terrestrial or satellite media, ability to support post-silicon modifications to existing receivers, allowing to improve implementations on receivers according to existing standards, ability to support post-silicon modifications to existing receivers, allowing changes in the standards, ability to support post-silicon modifications to existing receivers, allowing new broadcast standards or applications.

The drawings and their description hereinbefore illustrate rather than limit the invention. It will be evident that there are numerous alternatives which fall within the scope of the appended claims. In this respect, the following closing remarks are made.

Figure 13:
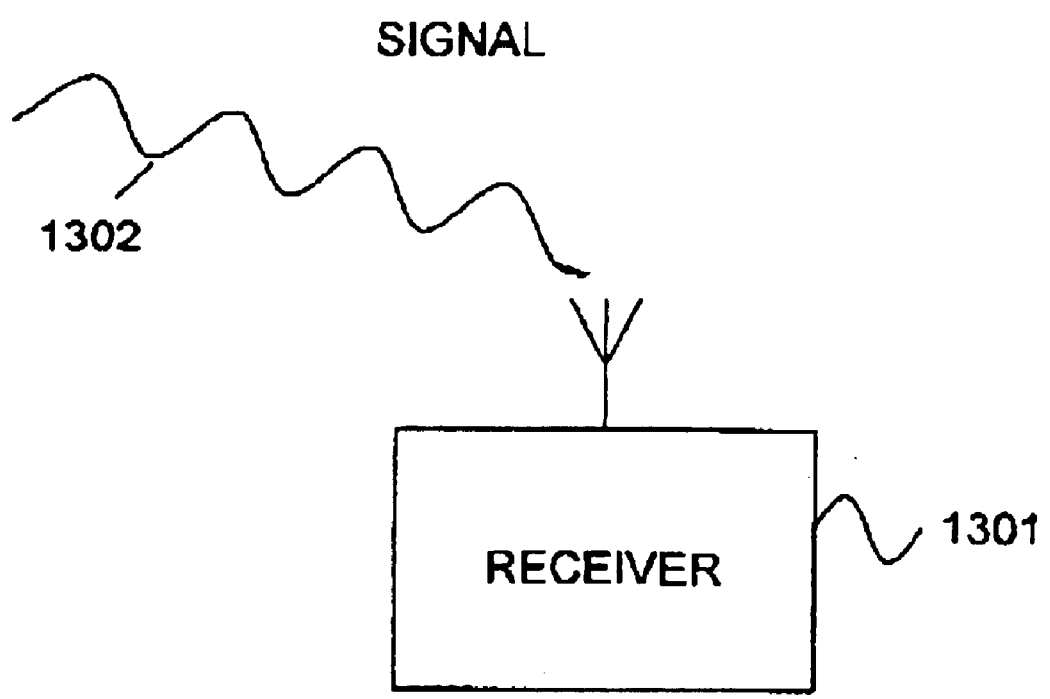
FIG. 13 shows a device in accordance with the invention.

FIG. 13 illustrates an embodiment or a device 1301 in accordance with the invention. The device 1301 is receiving a signal 1302. The signal 1302 is carrying a computer program for the programmable elements of the invention so that they can realize a method in accordance with the invention.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that a function is carried out by an assembly of items of hardware or software, or both.

What is claimed is:

1. A receiver, in a digital transmission system, comprising a channel decoder for protecting a transmitted signal against channel transmission errors, the channel decoder comprising:

a set of co-processors including at least 3 clusters of programmable co-processors for executing the functions of a digital front-end block (DFE), a channel correction block (CHN) and a forward error correction block (FEC), respectively, a general purpose processor (DSP) for managing control, synchronization and configuration of the channel decoder, and a memory (SM) shared between the clusters and the general purpose processor.

2. A receiver as claimed in claim 1, wherein the set of co-processors comprises:

a digital front-end processor (DFE) for computing:
base-band demodulation of the received signal,
a programmable Nyquist filter, and for controlling an automatic gain control loop (AGC) and synchronization loops for time and carrier recovery, a fast Fourier transform processor (FFT) for performing demodulation in the case of multi-carrier systems and frequency domain equalization in the case of mono-carrier systems, an adaptive filter array processor (AFA) for time domain equalization, interference rejection and frequency interpolation in the case of COFDM modulation, a forward error correction processor (FEC) for decoding Reed-Solomon and convolutional codes which were used during transmission.

3. A broadcasting system comprising a receiver and a transmitter, in a digital video transmission system, wherein the receiver is according to any one of claim 1.

4. In a digital video receiver, a method of channel decoding for protecting a transmitted signal against transmission errors, the method comprising the steps of base-band demodulation, channel correction and forward error correction of the received signal, each step being performed by a cluster of programmable co-processors, a general purpose processor with a shared memory being provided for managing control, synchronization and configuration of said clusters of co-processors.

5. A method of claim 4, wherein the method steps of base-band demodulation, channel correction and forward error correction is carried out by a set of instructions in a computer program product.

6. The receiver of claim 1, wherein the clusters of co-processors are programmable to allow for handling a plurality of data formats, and each respective cluster performs only a single one of the recited three functions.

7. The method of claim 4, wherein the clusters of co-processors are programmable to allow for handling a plurality of data formats, and each respective cluster performs only a single one of the recited three steps.

8. The method of claim 5, wherein the clusters of co-processors are programmable for handling a plurality of data formats, and each respective cluster performs only a single one of the recited three steps.

9. A channel decoder for digital video data comprising:

an input for receiving signals in differing formats;

at least one first cluster comprising at least one first programmable co-processor for executing functions of a digital front-end block (DFE), which first cluster is programmable to adapt to all of the differing formats;

at least one a second cluster comprising at least one second programmable co-processors for executing functions of a channel correction block (CHN), which second cluster is programmable to adapt to all of the differing formats;

at least one a third cluster comprising at least one third programmable co-processor for executing functions of a forward error correction block (FEC), which third cluster is programmable to adapt to all of the differing formats;

a general purpose processor (DSP) for managing control, synchronization and configuration of the channel cluster; and a memory (SM) shared between the processors.

10. The decoder of claim 9, wherein at least one of the processors is implemented in hardware.

11. The decoder of claim 9, wherein at least one of the processors is implemented in software.

12. The decoder of claim 9, wherein the decoder is adapted to receive a signal carrying a computer program for programming the processors.

13. The decoder of claim 9, wherein at least one of the first, second and third programmable co-processors comprises a cluster of co-processors.

* * * * *